Sept. 16, 1924.
F. J. HEALEY
1,508,879
VARIABLE VELOCITY RATIO GEARING
Filed Oct. 18, 1923      2 Sheets-Sheet 1
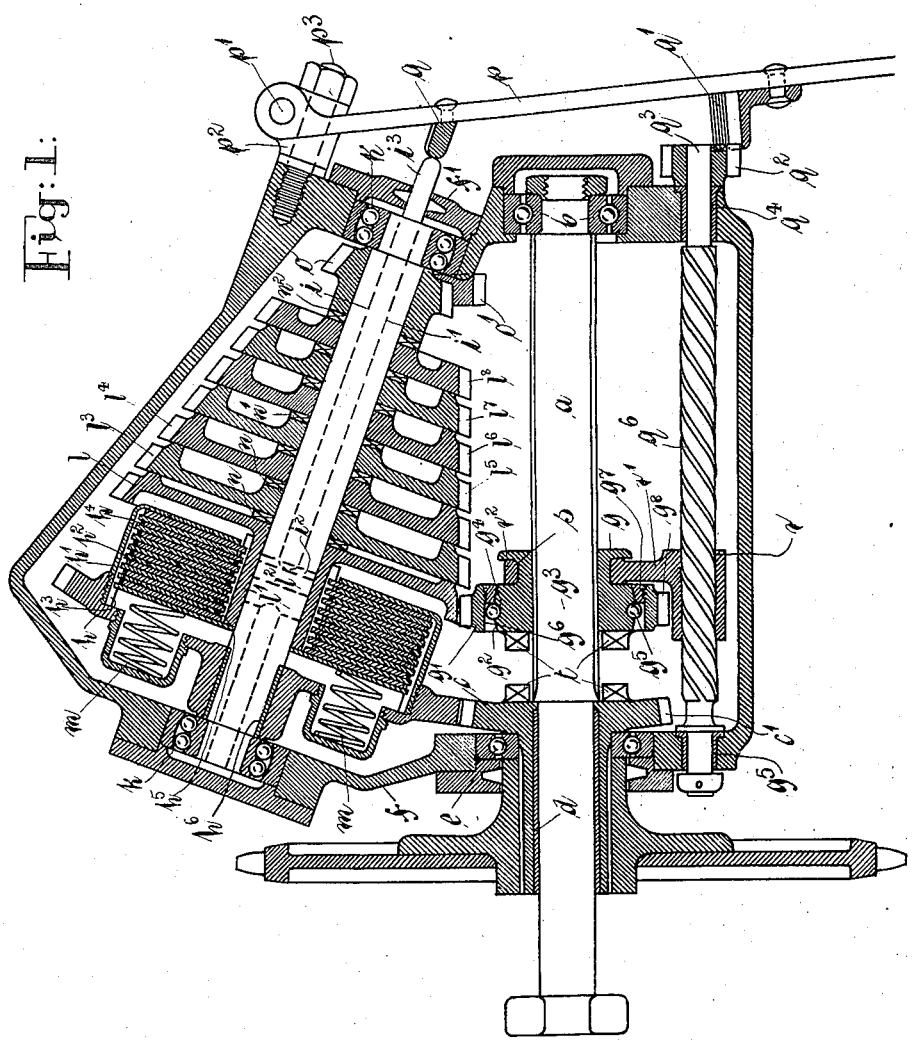
Francis Jeremiah Healey,
INVENTOR;
By
his Attorney.

Sept. 16, 1924.　　　　　　　　　　　　　　　　　　　　1,508,879
F. J. HEALEY
VARIABLE VELOCITY RATIO GEARING
Filed Oct. 18, 1923　　　2 Sheets-Sheet 2
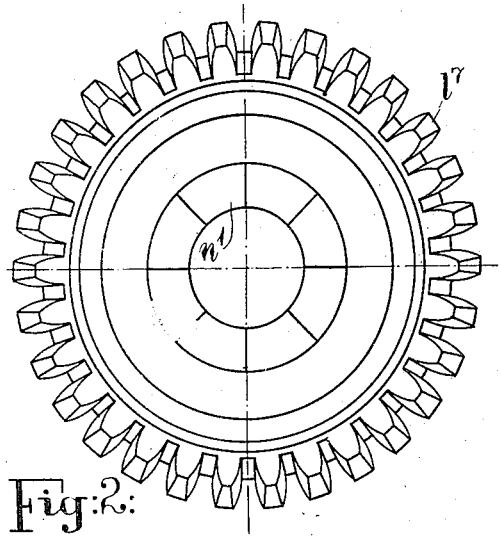
Fig:2:
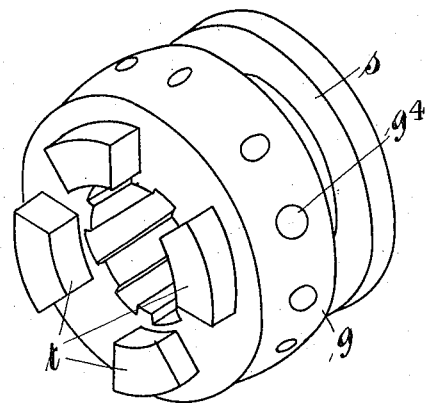
Fig:5:
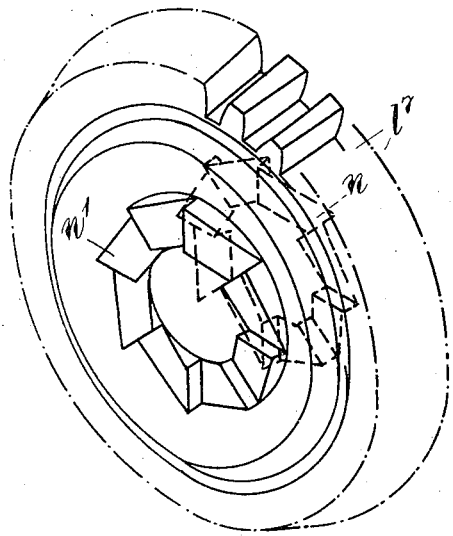
Fig:3:
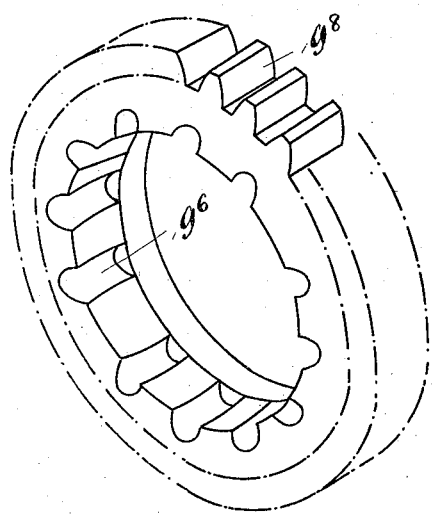
Fig:4:
Francis Jeremiah Healey
INVENTOR;
By
his Attorney.

Patented Sept. 16, 1924.

1,508,879

UNITED STATES PATENT OFFICE.

FRANCIS JEREMIAH HEALEY, OF LONDON, ENGLAND.

VARIABLE VELOCITY-RATIO GEARING.

Application filed October 18, 1923. Serial No. 669,210.

*To all whom it may concern:*

Be it known that I, FRANCIS JEREMIAH HEALEY, a subject of the King of Great Britain and Ireland, residing at London, England, have invented new and useful Improvements in and Relating to Variable Velocity-Ratio Gearing, of which the following is a specification.

This invention relates to improvements in variable velocity ratio gearing and has for its object the provision of means whereby a large selection of velocity ratios within predetermined limits is easily obtainable, a comparatively small space is occupied, and a very robust construction can be employed thus ensuring great adaptability, long life and efficient performance during use and under load.

Referring to the drawings. which form part of this specification,—

Figure 1 is a sectional elevation of one form of ratio gearing constructed in accordance with this invention.

Figure 2 is a front elevation of one of the individual gear wheels employed.

Figure 3 is an isometrical view of the gear wheel illustrated in Figure 2.

Figure 4 is an isometrical detail view of the mounting for the movable wheel illustrated in Figure 1.

Figure 5 is an isometrical detail view of the movable wheel for association with the mounting illustrated in Figure 4.

Referring to Fig. 1, one end of the shaft $a$ is mounted in a ball bearing $b$ whilst the other end of the shaft $a$ is mounted in a bush $d$ provided in the hub of the wheel $c$. The wheel $c$ is mounted in a ball bearing $e$ the ball bearings $e$ and $b$ being fitted in suitable housings carried by the gear case $f$. The part of the shaft $a$ within the gear box $f$ is castellated although one or more feathers or keys may be substituted in place of the castellations shown. On the castellated part of the shaft $a$ an element $g$ is mounted said element $g$ having a castellated bore adapted to engage with the castellated shaft $a$. The element $g$ forms a mounting for the gear ring $g'$, the surface $g^2$ of the element $g$ being spherical in form, the centre of the spherical surface being disposed at $g^3$. The bore of gear ring $g'$ is also provided with a spherical surface adapted to operatively engage with the spherical surface $g^2$ of the element $g$. The spherical surface of the element $g$ is provided with a plurality of pockets $g^4$ each of which has a ball $g^5$ located therein. The gear ring $g'$ is provided with as many transverse grooves $g^6$ as there are balls the grooves $g^6$ being angularly arranged so that the balls $g^5$ located in the pockets $g^4$ will operatively engage with the said grooves $g^6$ and mechanically associate the element $g$ with the gear ring $g'$.

In order to enable the gear ring $g'$ to be associated with the element $g$ a part of its spherical surface is removed and a screwed ring $g^7$ is provided, said screwed ring $g^7$ completing the spherical surface of the gear ring $g'$ and providing the journal of the gear ring $g'$ on the element $g$. The teeth $g^8$ of the gear ring $g'$ are of normal form and may be involute in character.

The wheel $c$ is provided with bevel teeth $c'$ which engage with suitable bevel teeth of a wheel $h$ loosely mounted on an angularly disposed shaft $i$, a bush $h^6$ being provided for the wheel $h$. The angularly disposed shaft $i$ has a bore $i'$ and is mounted in ball bearings $k$ which are housed in the gear case $f$. The wheel $h$ has a clutch case $h'$ mounted thereon, said clutch case $h'$ having a plurality of discs $h^2$ engaged by ribs $h^3$; the case $h'$ is also provided with a plurality of plates $h^4$ which do not engage with the ribs $h^3$ but do engage with ribs $h^5$ formed on the boss $l'$ of the wheel $l$. In order to ensure engagement between the disc $h^2$ and the discs $h^4$ and transmit motion from the case $h'$ to the wheel $l$ springs $m$ are provided.

The boss $l'$ has a transverse pin $l^2$ which passes through a slot $i^2$ formed in the shaft $i$ the pin $l^2$ being displaced in one direction by the spindle $i^3$ which passes through the bore $i'$ and is extended beyond the cap $f'$ of the case $f$. The shaft $i$ is provided with a plurality of wheels $l^3$, $l^4$, $l^5$, $l^6$, $l^7$ and $l^8$. Each of the wheels $l^3$—$l^8$ are provided with two jaw clutches $n$ and $n'$ the clutch $n$ being on one side of the wheel whilst the clutch $n'$ is on the opposite side of the wheel. The wheel $l$ is only provided with one clutch $n$ which engages with the clutch $n'$ of the wheel $l^3$.

The teeth of the clutches $n$ and $n'$ are of ratchet form so that in one direction of rotation the wheel $l$ transmits motion to the whole of the wheels $l^3$—$l^8$ one from another in sequence, whilst in the other direction of rotation if sufficient end-play is available no motion is transmitted.

The bevel wheel $o$ is also provided with a clutch $n^2$ adapted to engage with the clutch $n'$ of the wheel $l^8$ and receive motion therefrom. The wheel $o$ engages with a pinion $o'$ the teeth of the wheels $o$ and $o'$ being so proportioned that engagement is effected, and when the wheel $o'$ engages with the gear ring $g'$ motion in reverse direction is effected. The wheels $l$ and $l^3$—$l^8$ are provided with teeth adapted to engage with the teeth $g^8$ of the gear ring $g'$. The teeth $g^8$ of the gear ring $g'$ are of course parallel in character which necessitates the spaces between the teeth on the wheels $l$ and $l^3$—$l^8$ being also parallel, the teeth of the said wheels being angular in form and of such width that proper engagement is effected.

Notwithstanding the parallel spaces between the teeth on the wheels $l$ and $l^3$—$l^8$ proper engagement between the teeth of the said wheels and the teeth $g^8$ of the gear ring $g'$ would not normally be obtained. To effect this the gear ring $g'$ is mounted as hereinbefore described in order to allow the gear ring $g'$ to accommodate itself and ensure that the teeth $g^8$ engage with the teeth of either of the wheels $l$ and $l^3$—$l^8$ with line contact.

In order to operate the device as efficiently as possible an operating lever $p$ is provided said lever being pivoted at $p'$ on a mounting $p^2$ which is in turn pivoted on a pin $p^3$ carried by the gear case $f$. The lever $p$ has a segmental device $q$ so arranged and disposed as to engage with the end of the spindle $i^3$ in all angular positions within its limits of operation and further the lever $p$ is provided with a curved rack $p'$ so arranged as to be always in operative engagement with the pinion $q^2$ mounted on the spindle $q^3$. The spindle $q^3$ is journalled in the gear case $f$ at $q^4$ and $q^5$ and has a thread $q^6$ upon that part which is enclosed within a gear case $f$. The thread $q^6$ engages with the threaded bore $r$ of the device $r'$ which includes a fork $r^2$ adapted to engage in the groove $s$ of the element $g$. The element $g$ and the wheel $c$ are both provided with jaws $t$ adapted to engage one another and mechanically connect the shaft $a$ directly to the wheel $c$ when the teeth $g^8$ are not engaged by the teeth of the wheels $l$ or $l^3$—$l^8$.

In operation, motion may be transmitted to the wheel $c$ through the hub thereof from any desirable source; the wheels $h$, $l$ and $l^3$—$l^8$ being rotated thereby.

To engage the gear ring $g'$ with the wheel $l$ or either of the wheels $l^3$—$l^8$ the lever $p$ is angularly displaced towards the left. This movement of the lever $p$ moves the wheel $l$ towards the left against the action of the springs $m$ and releases the pressure on the plates of the clutch at the same time providing some lateral end-play so far as the wheels $l^3$—$l^8$ are concerned. By this means the wheels $l$ and $l^3$—$l^8$ are disconnected from the wheel $h$.

By angularly displacing the lever $p$ about the pivot $p^3$ the spindle $q^3$ is suitably rotated and the gear ring $g'$ is laterally displaced to effect engagement with either of the wheels $l$ or $l^3$—$l^8$ as desired.

It will be seen that owing to the end-play and the clutches $n$ and $n'$ between the wheels the teeth $g^8$ of the gear ring $g'$ can be freely engaged with the teeth of any of the wheels $l$ and $l^3$—$l^8$ in sequence inasmuch as the clutches $n$ and $n'$ provide for the necessary relative angular displacement of the wheels when the teeth thereof are contacted with or engaged by the teeth $g^8$ of the gear ring $g'$. As soon as the required engagement has been effected which can be determined by the angular displacement of the lever $p$ about the pivot $p^3$ the lever $p$ is released and the springs $m$ cause engagement between the ribs $h^3$ of the case $h'$ and the ribs $h^5$ of the boss $l'$ to be effected, all the clutches $n$ and $n'$ being simultaneously locked in engagement one with another, the result being that the wheel $h$, the wheel $l$, the wheels $l^3$—$l^8$ and the wheel $o$ are locked together into mechanical connection one with another.

As shown in the drawings the gear ring $g'$ is engaged with the wheel $l$ so that the velocity ratio of the shaft $a$ relative to the hub of the wheel $c$ will be predetermined by the proportions of the wheels $c$, $h$, $l$ and the gear ring $g'$.

It will be noted from Fig. 1 of the drawings that the external peripheries of the wheels $l$ and $l^3$—$l^8$ lie in the surface of a cone and that such cone is so angularly disposed that the part of its surface in proximity to the shaft $a$ is parallel with the axis of that shaft.

Although for purposes of illustration the gear ring $g'$ is connected to the element $g$ by means of balls to provide the required accommodation obviously any other form of accommodating connection may be employed without departing from the invention, and that further in less effective constructions the gear ring $g'$ may be positively mounted on the element $g$ without accommodation.

I claim:

1. In variable velocity ratio gearing having a plurality of toothed wheels the external peripheries of which are disposed in the surface of a cone, a shaft parallel with the surface of said cone and a displaceable toothed wheel on said shaft for engaging with one or other of the toothed wheels in said plurality, in combination, dog teeth on each of the toothed wheels in said plurality to enable each of said wheels to engage with an adjacent wheel, a spring for maintaining the dog teeth on the several wheels in engagement and means for disengaging said dog teeth.

2. In variable velocity ratio gearing as claimed in claim 1 in combination, tapered teeth having parallel separating spaces on the plurality of wheels in order that effective engagement can be obtained between the teeth of the wheels, the external peripheries of which are disposed in the surface of a cone, and the parallel teeth of the displaceable wheel, substantially as described.

3. In variable velocity ratio gearing as claimed in claim 1, the arrangement of the teeth of the displaceable wheel on a ring, a hub on the shaft and means adapted to connect the hub with the ring so as to allow angular deflection of the ring to take place in order that the teeth of the ring may engage by line contact with the teeth of any one of the wheels whose periphery lies in the surface of the cone substantially as described.

In testimony whereof I have signed my name to this specification in the presence of two subscribing witnesses.

FRANCIS JEREMIAH HEALEY.

Witnesses:
 DORIS HITCHCOCK,
 OLIVE WEST.